US012627928B2

(12) United States Patent
Yan et al.

(10) Patent No.: US 12,627,928 B2
(45) Date of Patent: May 12, 2026

(54) SOUND CHANNEL SWITCHING METHOD AND APPARATUS, AND ELECTRONIC DEVICE

(71) Applicant: VIVO MOBILE COMMUNICATION CO., LTD., Guangdong (CN)

(72) Inventors: Yannan Yan, Guangdong (CN); Liwen You, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 214 days.

(21) Appl. No.: 18/433,537

(22) Filed: Feb. 6, 2024

(65) Prior Publication Data

US 2024/0179466 A1 May 30, 2024

Related U.S. Application Data

(63) Continuation of application No. PCT/CN2022/109706, filed on Aug. 2, 2022.

(30) Foreign Application Priority Data

Aug. 6, 2021 (CN) ......................... 202110901164.1

(51) Int. Cl.
*H04R 5/04* (2006.01)
*H04R 5/02* (2006.01)
*H04S 3/00* (2006.01)

(52) U.S. Cl.
CPC ................. *H04R 5/04* (2013.01); *H04R 5/02* (2013.01); *H04S 3/008* (2013.01); *H04S 2400/01* (2013.01); *H04S 2400/13* (2013.01)

(58) Field of Classification Search
CPC .. H04R 5/02; H04R 5/04; H04S 3/008; H04S 2400/01; H04S 2400/13
See application file for complete search history.

(56) References Cited

U.S. PATENT DOCUMENTS 8,150,079 B2 * 4/2012 Maeda ................ H04M 1/0227 381/306
8,879,761 B2 * 11/2014 Johnson ................... H04R 3/12 381/306

(Continued)

FOREIGN PATENT DOCUMENTS

CN 103780765 A 5/2014
CN 104754490 A 7/2015

(Continued)

OTHER PUBLICATIONS

First Office Action for Chinese Application No. 202110901164.1, dated Dec. 1, 2022, 7 Pages.

(Continued)

*Primary Examiner* — Paul W Huber
(74) *Attorney, Agent, or Firm* — BROOKS KUSHMAN P.C.

(57) ABSTRACT

A channel switching method and apparatus, and an electronic device, and relates to the field of communication technologies. The method includes: in case that an electronic device plays audio and its target state changes, obtaining its state change parameter, the state change parameter including a folding angle, a rotation angle, or a scaling amplitude; according to the state change parameter, fusing first and second channel signals in a first manner to obtain a third channel signal, fusing the first and second channel signals in a second manner to obtain a fourth channel signal; controlling a first speaker playing the first channel signal to switch to the third channel signal, and controlling a second speaker playing the second channel signal to switch to the fourth channel signal, where before the channel signal switching, channels played by the first and second speakers do not match orientations of the speakers.

17 Claims, 6 Drawing Sheets

(56) References Cited

U.S. PATENT DOCUMENTS

| | | | | |
|---|---|---|---|---|
| 9,241,217 | B2 * | 1/2016 | Rodgers | G06F 1/1688 |
| 12,143,790 | B2 * | 11/2024 | Jung | H04R 1/028 |
| 2011/0150247 | A1 * | 6/2011 | Oliveras | G06F 3/165 73/514.16 |
| 2011/0316768 | A1 * | 12/2011 | McRae | G06F 3/165 381/80 |
| 2013/0163794 | A1 * | 6/2013 | Groves | G06F 1/1626 381/303 |
| 2014/0233772 | A1 * | 8/2014 | Giustina | H04R 5/04 381/306 |
| 2014/0286502 | A1 | 9/2014 | Chen et al. | |
| 2015/0023533 | A1 | 1/2015 | Johnson et al. | |
| 2016/0142843 | A1 | 5/2016 | Leschka et al. | |
| 2017/0289723 | A1 * | 10/2017 | Yoo | H04S 3/002 |
| 2019/0246208 | A1 | 8/2019 | Nam et al. | |
| 2020/0053465 | A1 * | 2/2020 | Wang | H04R 5/04 |
| 2020/0053500 | A1 * | 2/2020 | Tran | H04S 7/303 |
| 2021/0058704 | A1 | 2/2021 | Tang et al. | |
| 2022/0174445 | A1 * | 6/2022 | So | H04S 7/30 |

FOREIGN PATENT DOCUMENTS

| | | | |
|---|---|---|---|
| CN | 108040313 | A | 5/2018 |
| CN | 208834288 | U | 5/2019 |
| CN | 110730260 | A | 1/2020 |
| CN | 110809226 | A | 2/2020 |
| CN | 111316669 | A | 6/2020 |
| CN | 111629304 | A | 9/2020 |
| CN | 112689220 | A | 4/2021 |
| CN | 113206905 | A | 8/2021 |
| CN | 113630695 | A | 11/2021 |
| WO | 2019228163 | A1 | 12/2019 |
| WO | 2021147718 | A1 | 7/2021 |

OTHER PUBLICATIONS

Extended European Search Report for Application No. 22852185.2, dated Oct. 22, 2024, 8 Pages.

International Search Report and Written Opinion for Application No. PCT /CN2022/109706, dated Aug. 30, 2022, 8 Pages.

* cited by examiner

SOUND CHANNEL SWITCHING METHOD AND APPARATUS, AND ELECTRONIC DEVICE

CROSS-REFERENCE TO RELATED APPLICATIONS

This application is a continuation of PCT International Application No. PCT/CN2022/109706 filed on Aug. 2, 2022, which claims priority to Chinese Patent Application No. 202110901164.1 filed on Aug. 6, 2021, which are incorporated herein by reference in their entireties.

TECHNICAL FIELD

This application relates to the field of communication technologies, and specifically relates to a sound channel switching method and apparatus, and an electronic device.

BACKGROUND

Currently, many electronic devices are equipped with a plurality of speakers, and audio of different sound channels is played by using speakers in different orientations, to implement a stereo play effect. Taking an electronic device with four speakers as an example, a left sound channel is generally played by using two speakers at the top of the electronic device, and a right sound channel is played by using two speakers at the bottom to implement a stereo effect. However, when the electronic device switches a state, for example, is rotated or folded, an orientation of a speaker changes. In this case, sound channel signals played by some speakers do not match human ears, thereby affecting a stereo play effect.

SUMMARY

According to a first aspect, an embodiment of this application provides a sound channel switching method, applied to an electronic device, where the method includes:

obtaining a state change parameter of the electronic device in a case that the electronic device plays audio and a target state of the electronic device changes, where the state change parameter includes a folding angle, a rotation angle, or a scaling amplitude, and the scaling amplitude is a scaling amplitude of a screen of the electronic device;

fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal; and controlling a first speaker to switch from playing the first sound channel signal to playing the third sound channel signal, and controlling a second speaker to switch from playing the second sound channel signal to playing the fourth sound channel signal, where before a sound channel signal is switched, sound channels played by the first speaker and the second speaker do not match orientations in which the first speaker and the second speaker are located.

According to a second aspect, an embodiment of this application provides a sound channel switching apparatus, applied to an electronic device, where the sound channel switching apparatus includes:

an obtaining module, configured to obtain a state change parameter of the electronic device in a case that the electronic device plays audio and a target state of the electronic device changes, where the state change parameter includes a folding angle, a rotation angle, or a scaling amplitude, and the scaling amplitude is a scaling amplitude of a screen of the electronic device;

a processing module, configured to: fuse a first sound channel signal and a second sound channel signal according to the state change parameter in a first fusion manner to obtain a third sound channel signal, and fuse the first sound channel signal and the second sound channel signal in a second fusion manner to obtain a fourth sound channel signal; and a control module, configured to: control a first speaker to switch from playing the first sound channel signal to playing the third sound channel signal, and control a second speaker to switch from playing the second sound channel signal to playing the fourth sound channel signal, where before a sound channel signal is switched, sound channels played by the first speaker and the second speaker do not match orientations in which the first speaker and the second speaker are located.

According to a third aspect, an embodiment of this application provides an electronic device. The electronic device includes a processor, a memory, and a program or an instruction that is stored in the memory and that can be run on the processor, and the program or the instruction is executed by the processor to implement the steps of the sound channel switching method according to the first aspect.

According to a fourth aspect, an embodiment of this application provides a readable storage medium. The readable storage medium stores a program or an instruction, and the program or the instruction is executed by a processor to implement the steps of the sound channel switching method according to the first aspect.

According to a fifth aspect, an embodiment of this application provides a chip. The chip includes a processor and a communication interface, the communication interface is coupled to the processor, and the processor is configured to run a program or an instruction to implement the steps of the sound channel switching method according to the first aspect.

According to a sixth aspect, an embodiment of this application provides a computer program product. The program product is stored in a non-volatile storage medium, and the program product is executed by at least one processor to implement the steps of the sound channel switching method according to the first aspect.

According to a seventh aspect, an embodiment of this application provides an electronic device. The electronic device is configured to perform the steps of the sound channel switching method according to the first aspect.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

In the specification and claims of this application, the terms "first", "second", and the like are intended to distinguish between similar objects but do not describe a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

With reference to the accompanying drawings, a sound channel switching method provided in the embodiments of this application is described in detail by using specific embodiments and application scenarios thereof.

Figure 1:
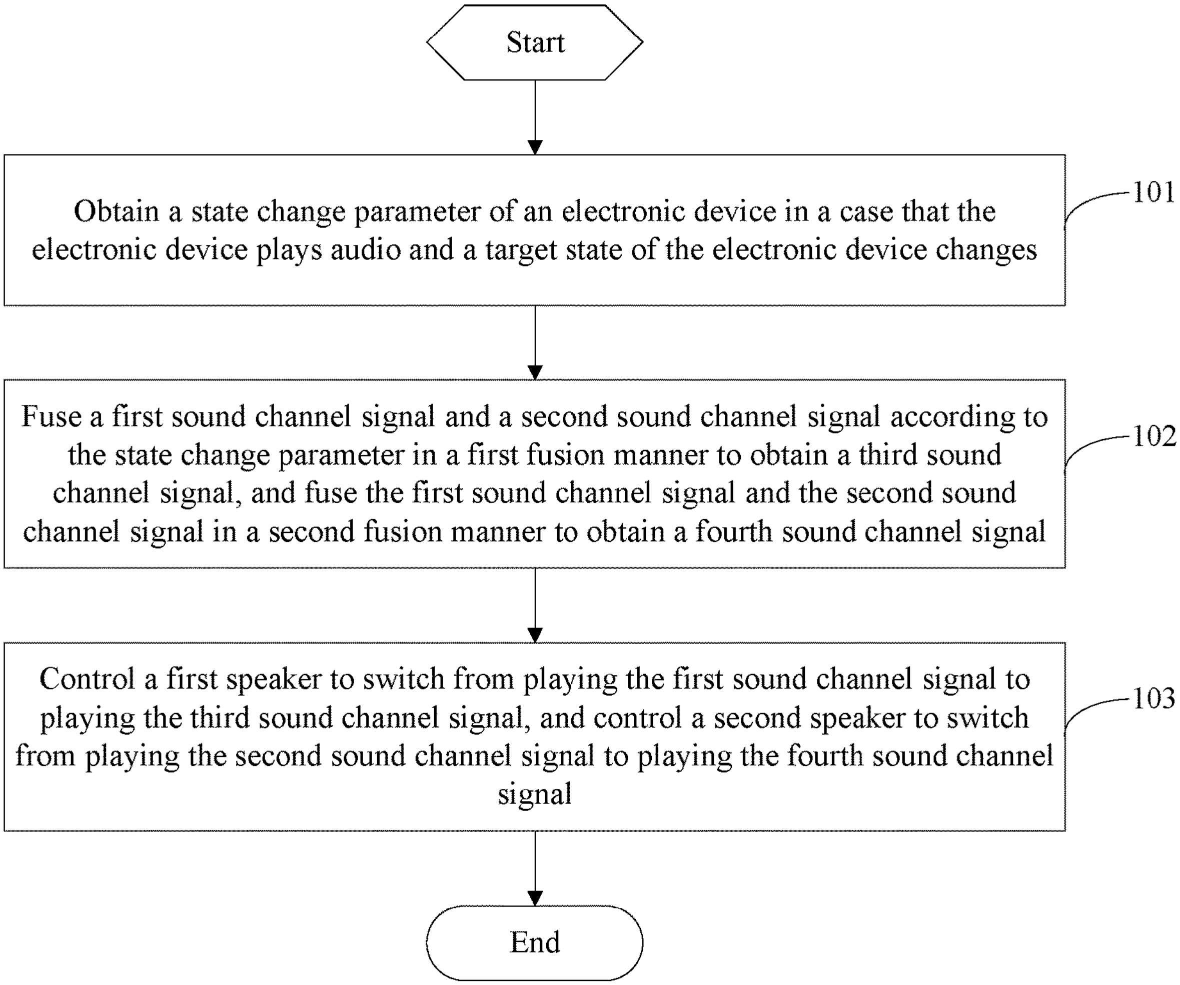
FIG. 1 is a flowchart of a sound channel switching method according to an embodiment of this application.

FIG. 1 is a flowchart of a sound channel switching method according to an embodiment of this application, applied to an electronic device. As shown in FIG. 1, the method includes the following steps:

Step 101: Obtain a state change parameter of the electronic device in a case that the electronic device plays audio and a target state of the electronic device changes.

The state change parameter includes a folding angle, a rotation angle, or a scaling amplitude, and the scaling amplitude is a scaling amplitude of a screen of the electronic device.

This embodiment of this application may be applied to an electronic device with a foldable screen, an electronic device with a rollable screen, or a common electronic device, and is applied to an electronic device with a plurality of speakers, for example, an electronic device with four speakers, where two speakers are disposed on the top of the electronic device, and two speakers are disposed on the bottom of the electronic device. For the foldable or electronic device with a rollable screen, when the electronic device is in a stretched state, one speaker at the top and one speaker at the bottom are on the left side of the electronic device, and the other speaker at the top and the other speaker at the bottom are on the right side of the electronic device. When the electronic device switches from a portrait state to a landscape state, the two speakers at the top are located on the left or right side of the electronic device, and correspondingly, the two speakers at the bottom are located on the right or left side of the electronic device.

The target state may be a folding state, a rotation state, a scaling state, or the like, and correspondingly, the state change parameter may be a folding angle, a rotation angle, a scaling amplitude, or the like.

For the electronic device with a foldable screen, a folding angle of the electronic device may be obtained when a folding state of the electronic device with a foldable screen changes, for example, when the electronic device with a foldable screen is folded or stretched. This may be specifically obtained by detecting the folding angle in real time.

When a rotation state of the electronic device changes, for example, the electronic device is rotated clockwise or counterclockwise to switch between landscape use and portrait use, the rotation angle of the electronic device may be specifically obtained by detecting the rotation angle in real time.

For the electronic device with a rollable screen, a scaling amplitude of the electronic device may be obtained when a scaling state of the electronic device changes, for example, a rollable screen is stretched or contracted. This may be obtained by detecting the scaling amplitude in real time.

Figure 2A:
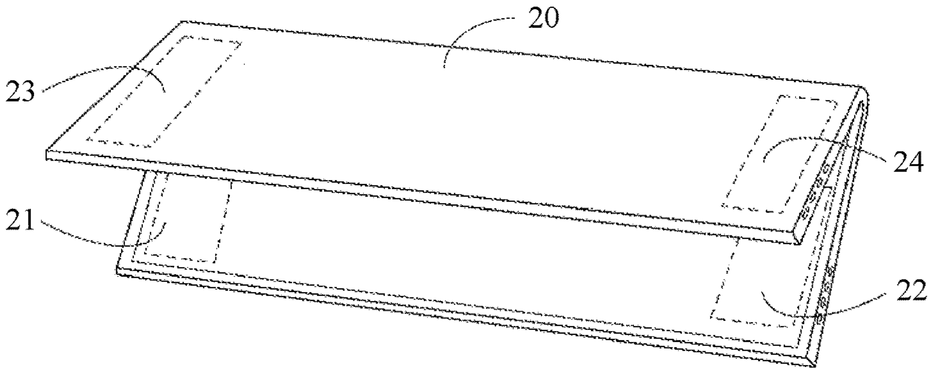
FIG. 2*a* is a schematic diagram of a first folding state of an electronic device according to an embodiment of this application.
Figure 2B:
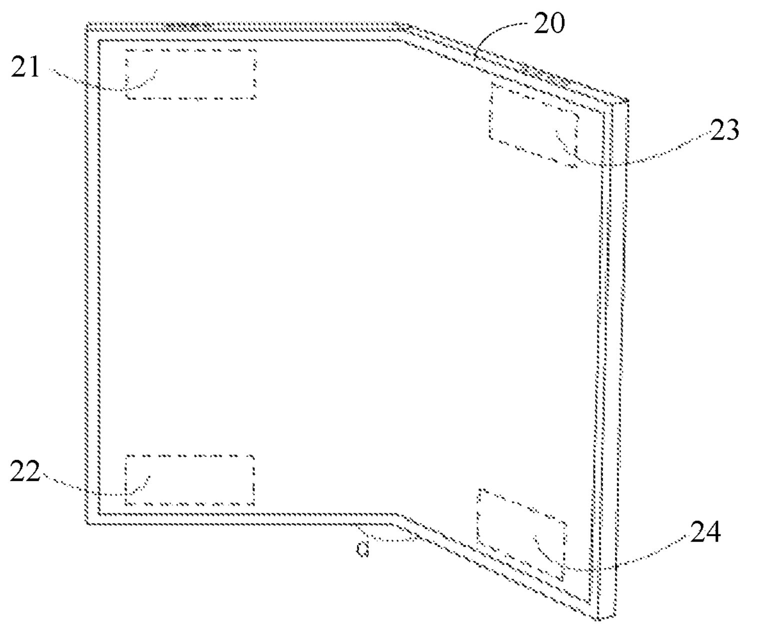
FIG. 2*b* is a schematic diagram of a second folding state of an electronic device according to an embodiment of this application.
Figure 3A:
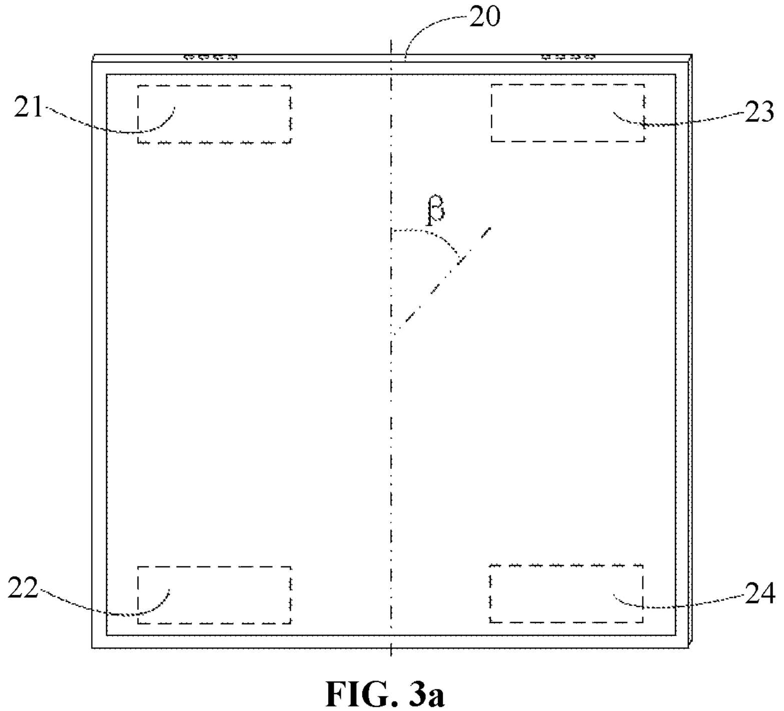
FIG. 3*a* is a schematic diagram of an electronic device in a stretched state according to an embodiment of this application.
Figure 3B:
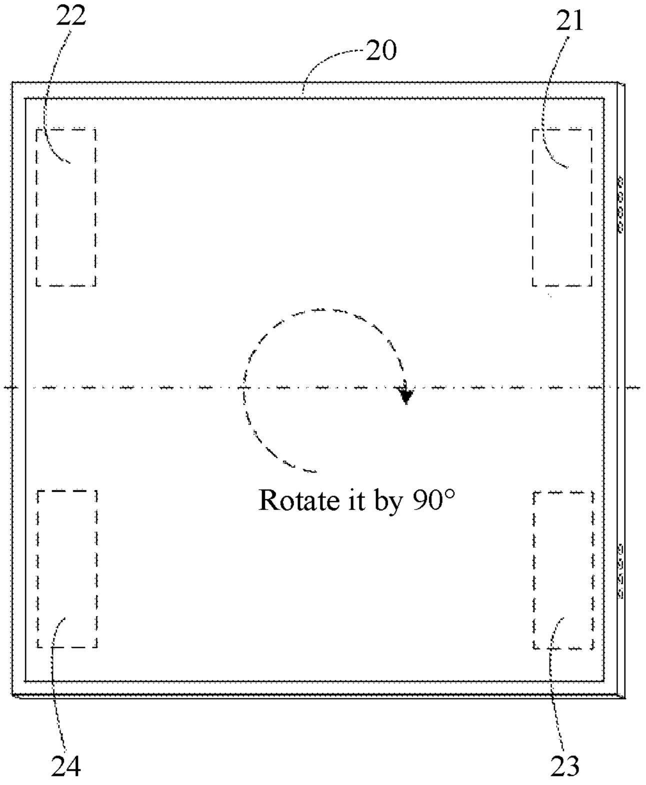
FIG. 3*b* is a schematic diagram in which an electronic device is rotated clockwise by 90 degrees in a stretched state according to an embodiment of this application.
Figure 4A:
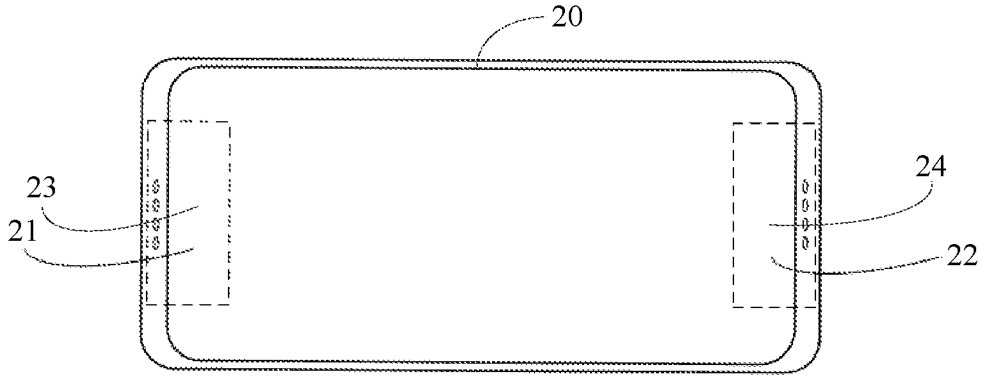
FIG. 4*a* is a schematic diagram of an electronic device in a landscape state according to an embodiment of this application.
Figure 4B:
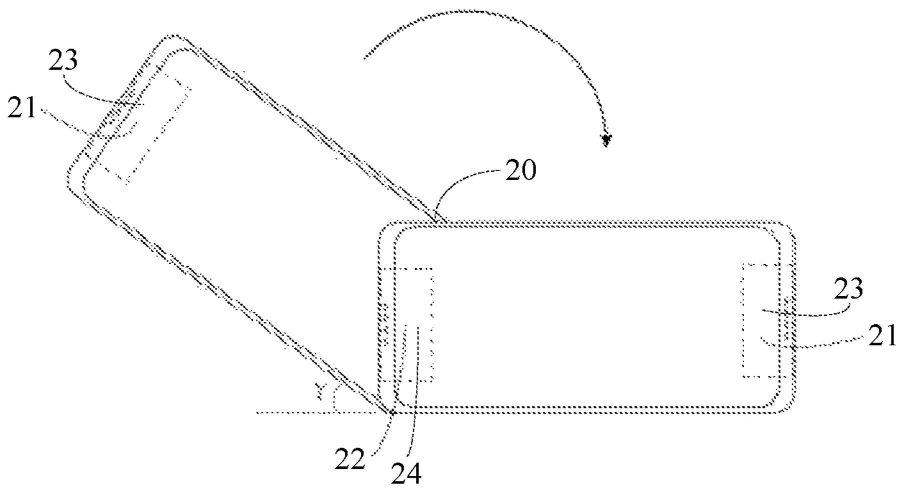
FIG. 4*b* is a schematic diagram in which an electronic device is rotated clockwise by 180 degrees in a landscape state according to an embodiment of this application.

In the related technology, when the electronic device is in a normal portrait state, a speaker at the top generally plays audio on a left sound channel, and a speaker at the bottom plays audio on a right sound channel. However, when the electronic device is rotated, folded, or scaled, orientations of some speakers of the electronic device change accordingly. For example, as shown in FIG. 2*a* and FIG. 2*b*, when an electronic device 20 with a foldable screen in a folding state is gradually stretched, a top speaker 21 and a bottom speaker 22 are located on the left side of the electronic device 20, and a top speaker 23 and a bottom speaker 24 are located on the right side of the electronic device 20. For another example, as shown in FIG. 3*a* and FIG. 3*b*, when the electronic device 20 with a foldable screen in a stretched state is rotated clockwise by 90 degrees from a portrait state, the top speaker 21 is switched from the left side of the electronic device 20 to the right side of the electronic device 20, and the bottom speaker 24 is switched from the right side of the electronic device 20 to the left side of the electronic device 20. For another example, as shown in FIG. 4*a* and FIG. 4*b*, when the electronic device 20 is rotated clockwise by 180 degrees from a landscape state, the top speaker 21 and the top speaker 23 are switched from the left side of the electronic device 20 to the right side of the electronic device 20, and the bottom speaker 22 and the bottom speaker 24 are switched from the right side of the electronic device 20 to the left side of the electronic device 20. For the electronic device with a rollable screen, when the electronic device with a rollable screen is stretched outward in a contracted state, one speaker at the top and one speaker at the bottom are switched to the left side of the electronic device, and the other speaker at the top and the other speaker at the bottom are switched to the right side of the electronic device.

In this embodiment of this application, considering that orientations of some speakers of the electronic device change when the target state of the electronic device changes, if an existing playing sound channel of each speaker keeps unchanged, some left speakers may play audio on a right sound channel, and some right speakers may play audio on a left sound channel, which do not match human hearing, and affects a human sense of hearing, that is, a stereo play effect becomes poor. Therefore, to obtain a better stereo play effect, sound channels may be switched for speakers whose orientations change and playing sound channels do not match current orientations, to ensure that sound channel audio played by each speaker of the electronic device after the target state changes keep matching with human ears. In addition, to ensure an audio play effect in the process of changing the target state and avoid problems such as stuttering or silence, sound channel signals of these speakers may be fused according to a real-time state change parameter of the electronic device. For example, for a speaker that originally plays a left sound channel signal, the left sound channel signal and the sound right sound channel signal may be fused in a corresponding ratio according to a current state change parameter, so that the speaker plays a fused sound channel signal.

Step 102: Fuse a first sound channel signal and a second sound channel signal according to the state change parameter in a first fusion manner to obtain a third sound channel signal, and fuse the first sound channel signal and the second sound channel signal in a second fusion manner to obtain a fourth sound channel signal.

Therefore, in this step, the first sound channel signal and the second sound channel signal in audio currently played by the electronic device may be obtained. Specifically, different sound channel signals may be obtained in real time from an audio digital signal processor (aDSP), where the first sound channel signal and the second sound channel signal may be respectively a left sound channel signal and a right sound channel signal. Certainly, the first sound channel signal and the second sound channel signal may be sound channel signals other than the left sound channel signal and the right sound channel signal in a scenario in which there are more sound channels such as a front sound channel and a back sound channel.

Then, the first sound channel signal and the second sound channel signal may be fused according to the current state change parameter of the electronic device in the first fusion manner, to obtain the fused third sound channel signal, and the first sound channel signal and the second sound channel signal may be fused in the second fusion manner, to obtain the fused fourth sound channel signal. Specifically, a fusion ratio coefficient may be determined based on the state change parameter, and one sound channel signal is fused to another sound channel signal according to the ratio coefficient. For example, when it is determined that the fusion ratio coefficient is 0.3, the first fusion manner may be that the second sound channel signal is multiplied by 0.3 to be fused into the first sound channel signal, and the second fusion manner may be that the first sound channel signal is multiplied by 0.3 to be fused into the second sound channel signal. Alternatively, the first sound channel signal and the second sound channel signal may be fused according to a ratio of 7:3 to obtain the third sound channel signal, and the first sound channel signal and the second sound channel signal may be fused according to a ratio of 3:7 to obtain the fourth sound channel signal.

It should be noted that, after the target state of the electronic device changes to a desired state, for example, after the screen is completely stretched or is switched from a portrait state to a landscape state, the first fusion manner may be switching the first sound channel signal to the second sound channel signal, and the second fusion manner may be switching the second sound channel signal to the first sound channel signal. In this case, the third sound channel signal is the second sound channel signal, and the fourth sound channel signal is the first sound channel signal.

Optionally, step 102 includes:

- separately obtaining a first spectrum amplitude value of the first sound channel signal and a second spectrum amplitude value of the second sound channel signal;
- determining a fusion component according to the state change parameter, the first spectrum amplitude value, and the second spectrum amplitude value;
- performing first operation processing on the first spectrum amplitude value and the fusion component to obtain a third spectrum amplitude value of the fused third sound channel signal; and
- performing second operation processing on the second spectrum amplitude value and the fusion component to obtain a fourth spectrum amplitude value of the fused fourth sound channel signal.

That is, in an embodiment, when the first sound channel signal and the second sound channel signal are fusing, spectrum amplitude values of the first sound channel signal and the second sound channel signal may be separately obtained in frequency domain, so as to obtain the first spectrum amplitude value and the second spectrum amplitude value. Then, the determining a fusion component according to the state change parameter, the first spectrum amplitude value, and the second spectrum amplitude value may be specifically determining a change ratio of the target state based on the state change parameter, and using a corresponding ratio of a difference between the first spectrum amplitude value and the second spectrum amplitude value as the fusion component of the sound channel signal.

Then, first operation processing such as simple addition/subtraction processing or weighting processing may be performed on the first spectrum amplitude value and the fusion component to obtain the third spectrum amplitude value, and second operation processing such as simple addition/subtraction processing or weighting processing is performed on the second spectrum amplitude value and the fusion component to obtain the fourth spectrum amplitude value, where the third spectrum amplitude value is a spectrum amplitude value of the fused third sound channel signal, and the fourth spectrum amplitude value is a spectrum amplitude value of the fused fourth sound channel signal. The third spectrum amplitude value and the fourth spectrum amplitude value may be separately converted into sound channel signals in time domain, to obtain the third sound channel signal and the fourth sound channel signal.

In this way, in this embodiment, corresponding fusion may be performed on the first sound channel signal and the second sound channel signal according to a state change of the electronic device, to ensure a stereo play effect after channel switching.

When the spectrum amplitude values of the first sound channel signal and the second sound channel signal are obtained, amplitude characteristics in frequency domain may be obtained by obtaining time domain signal characteristics of the signals and then performing transform on the time domain signal characteristics. In other words, the separately obtaining a first spectrum amplitude value of the first sound channel signal and a second spectrum amplitude value of the second sound channel signal may include:

separately obtaining a first amplitude characteristic of the first sound channel signal in frequency domain and a second amplitude characteristic of the second sound channel signal in frequency domain; and separately converting the first amplitude characteristic and the second amplitude characteristic into spectrum amplitude values, to obtain the first spectrum amplitude value and the second spectrum amplitude value.

That is, the amplitude characteristics of the first sound channel signal and the second sound channel signal in frequency domain may be separately obtained, and then Fourier transform is separately performed on the amplitude characteristics of the first sound channel signal and the second sound channel signal in frequency domain. Finally, the transform amplitude characteristics are converted into spectrum amplitude values, to obtain the first spectrum amplitude value of the first sound channel signal and the second spectrum amplitude value of the second sound channel signal.

For example, an amplitude characteristic $X_1$ of a left sound channel signal $x_1$ in frequency domain and an amplitude characteristic $X_2$ of a right sound channel signal $x_2$ in frequency domain may be obtained in real time from the aDSP, and fast Fourier transform is performed on the left and right sound channel signals. A transform formula is $$X(k) = \sum_{j=1}^{N} x(j)\omega_N^{(j-1)(k-1)},$$

where $\omega_N = e^{(-2\pi i)/N}$. Then, the amplitude characteristics are obtained by transforming the left and right sound channel signals are converted into spectrum amplitude values, where the spectrum amplitude value of the left sound channel signal may be represented as $X_1(k)' = |20\times\log_{10} X_1(k)|$, and the spectrum amplitude value of the right sound channel signal may be represented as $X_2(k)' = |20\times\log_{10} X_2(k)|$.

In this way, the spectrum amplitude values of the first sound channel signal and the second sound channel signal can be quickly obtained in this embodiment.

Optionally, the determining a fusion component according to the state change parameter, the first spectrum amplitude value, and the second spectrum amplitude value includes:

determining a state coefficient according to the state change parameter and a maximum change value of the target state; and calculating a product of the state coefficient and a first difference to obtain the fusion component, where the first difference is a difference between the first spectrum amplitude value and the second spectrum amplitude value.

That is, in an embodiment, the state coefficient may be determined according to the state change parameter and the maximum change value of the target state. For example, the state coefficient may be determined according to a ratio of the state change parameter to the maximum change value of the target state, and then the product of the difference between the first spectrum amplitude value and the second spectrum amplitude value and the state coefficient is used as the fusion component.

The maximum change value of the target state may be specifically determined according to a specific type of the target state or a type of the state change parameter. In an embodiment, when the state change parameter is a folding angle, the maximum change value of the target state is 180 degrees;

when the state change parameter is a rotation angle, the maximum change value of the target state is 90 degrees or 180 degrees; or when the state change parameter is a scaling amplitude, the maximum change value of the target state is a maximum scaling amplitude of the screen of the electronic device.

For example, for folding state, because a maximum folding angle is 180 degrees, the maximum change value of the folding state may be 180 degrees. For a rotation state, considering that an orientation of a speaker changes each time when the electronic device with a foldable screen is rotated by 90 degrees in a stretched state, so as a maximum value of the rotation state may be determined as 90 degrees. In another case, for the common electronic device, a case that the electronic device is flipped leftwards and rightwards in a landscape state may also be considered, and in this case, a maximum value of the rotation state may be 180 degrees each time. For a scaling state, a maximum scaling amplitude of a screen such as a rollable screen of the electronic device may be a maximum value of the scaling state, that is, the maximum scaling amplitude is a difference between a screen length of the rollable screen when the rollable screen is fully stretched and a screen length of the rollable screen when the rollable screen is completely contracted.

A maximum folding angle of 180 degrees is used as an example. It is assumed that a current folding angle is a, and a state coefficient $\sigma$ may be $\alpha/180°$. An expected fusion component delta may be obtained by multiplying a difference between spectrum amplitude values of left and right sound channels (that is, a frequency domain characteristic difference between the two sound channels) by the state coefficient $\sigma$, that is, delta$=\sigma\cdot[X_1(k)'-X_2(k)']$, where $0\le\sigma\le1$.

In this way, the fusion component that is consistent with the change of the target state can be quickly obtained by means of calculation in this implementation, to ensure a subsequent sound channel fusion effect.

Optionally, the performing first operation processing on the first spectrum amplitude value and the fusion component to obtain a third spectrum amplitude value of the fused third sound channel signal includes:

subtracting the fusion component from the first spectrum amplitude value to obtain the third spectrum amplitude value; and the performing second operation processing on the second spectrum amplitude value and the fusion component to obtain a fourth spectrum amplitude value of the fused fourth sound channel signal includes:

adding the second spectrum amplitude value and the fusion component to obtain the fourth spectrum amplitude value.

That is, after the fusion component is determined in the foregoing manner, the fusion component may be added to or subtracted from the spectrum amplitude values of the first sound channel signal and the second sound channel signal to obtain the spectrum amplitude values of the fused sound channel signals. Specifically, the fusion component is subtracted from the first spectrum amplitude value to obtain the third spectrum amplitude value of the fused third sound channel signal, and the second spectrum amplitude value is added to the fusion component to obtain the fourth spectrum amplitude value of the fused fourth sound channel signal.

For example, when the fusion component is delta=$\sigma\cdot[X_1(k)'-X_2(k)']$, a spectrum amplitude value of a fused new left sound channel may be $X_1(k)'$-delta, and a spectrum amplitude value of a fused new right sound channel may be $X_2(k)'$+delta.

It should be noted that, when the fusion component is calculated in the foregoing manner, the difference between the second spectrum amplitude value and the first spectrum amplitude value may be multiplied by the state coefficient to obtain the fusion component, that is, delta=$\sigma\cdot[X_2(k)'-X_1(k)']$. In this calculation manner, the first spectrum amplitude value may be correspondingly added to the fusion component to obtain the fused third spectrum amplitude value, and the fusion component is subtracted from the second spectrum amplitude value to obtain the fused fourth spectrum amplitude value.

After the fused sound channel spectrum amplitude value is obtained by means of calculation, the fused sound channel spectrum amplitude value may be restored to a time domain signal, that is, fast Fourier inverse transform may be performed on the third spectrum amplitude value and the fourth spectrum amplitude value to obtain the third sound channel signal and the fourth sound channel signal in time domain. A calculation formula of fast Fourier inverse transform may be $$X'(k) = (1/N)\sum_{k=1}^{N} x'(k)\omega_N^{-(j-1)(k-1)},$$

where $\omega_N=e^{(-2\pi i)/N}$.

In this way, simple calculation processing is performed on the spectrum amplitude values of the two sound channel signals based on the state coefficient in this implementation, so that the two sound channel signals can be fused and switched. In addition, the two sound channel signals are fused in ratio according to the state variable amount, thereby ensuring a smooth sound channel fusing effect.

Step 103: Control a first speaker to switch from playing the first sound channel signal to playing the third sound channel signal, and control a second speaker to switch from playing the second sound channel signal to playing the fourth sound channel signal, where before a sound channel signal is switched, sound channels played by the first speaker and the second speaker do not match orientations in which the first speaker and the second speaker are located.

After the first sound channel signal and the second sound channel signal are fused, an orientation may be changed according to a current change of the target state, so that sound channel switching is performed on a speaker whose original playing sound channel does not match the current orientation. Specifically, for a speaker whose playing sound channel is the first sound channel signal before the target state changes and whose sound channel signal does not match the current orientation, the playing sound channel may be switched to the third sound channel signal, and for a speaker whose playing sound channel is the second sound channel signal before the target state changes and whose sound channel signal does not match the current orientation, the playing sound channel may be switched to the fourth sound channel signal, to complete the playing sound channel of the speaker switching following the target state.

The first speaker may be a speaker whose original playing sound channel is the first sound channel signal and whose orientation is about to change with the change of target state or is no longer suitable for the first sound channel signal after the change. The second speaker may be a speaker whose original playing sound channel is the second sound channel signal and whose orientation changes with the target state and is about to change or is no longer suitable for the second sound channel signal after the change.

For example, when the electronic device 20 is switched from a folding state shown in FIG. 2*a* to a stretched state shown in FIG. 2*b*, orientations of the top speaker 21 and the bottom speaker 22 change to the left side, and orientations of the top speaker 23 and the bottom speaker 24 change to the right side, so that the bottom speaker 22 that originally plays a right sound channel no longer matches the current orientation, and the top speaker 23 that originally plays a left sound channel no longer matches the current orientation either. In this case, the top speaker 23 and the bottom speaker 22 are the first speaker and the second speaker that need to switch sound channels. Therefore, a left sound channel signal and a right sound channel signal may be fused according to step 102, and a playing sound channel of the top speaker 23 is controlled to switch from the left sound channel signal to the right sound channel signal and a playing sound channel of the bottom speaker 22 is controlled to switch from the right sound channel signal to the left sound channel signal.

Optionally, before step 103, the method further includes:

predicting an orientation of each speaker in a plurality of speakers of the electronic device after the target state of the electronic device changes; and in a case that a sound channel currently played by a target speaker in the plurality of speakers does not match a predicted orientation of the target speaker, determining that the target speaker is a to-be-switched speaker, where a speaker that currently plays the first sound channel signal in the to-be-switched speaker is the first speaker, and a speaker that currently plays the second sound channel signal in the to-be-switched speaker is the second speaker.

That is, in an implementation, when it is detected that the target state of the electronic device changes, an orientation of each speaker of the electronic device after the target state changes may be predicted. For example, for an electronic device with a foldable screen, when the electronic device with a foldable screen is gradually stretched from a folding state, an orientation of each speaker at the top and at the bottom after the stretching may be predicted, or when the electronic device switches from a portrait state to a landscape state, an orientation of each speaker after the switching may be predicted.

It may be determined, according to the predicted orientation, whether a sound channel currently played by each speaker matches the changed orientation. For example, as shown in FIG. 2*a* and FIG. 2*b*, for the top speaker 23, it may be determined that a left sound channel signal currently played by the top speaker 23 does not match a right orientation in which the speaker is stretched, and it is determined that a right sound channel signal currently played by the bottom speaker 22 does not match a left orientation in which the speaker is stretched. Alternatively, as shown in FIG. 3*a* and FIG. 3*b*, the top speaker 21 switches from the left side to the right side after being rotated clockwise by 90 degrees, and therefore the left sound channel signal that is originally played does not match the current orientation, and the bottom speaker 24 switches from the right side to the left side after being rotated clockwise by 90 degrees, and therefore the right sound channel signal that is originally played does not match the current orientation.

In this way, a speaker whose sound channel needs to be switched may be determined according to an orientation of each speaker after the target state changes and the currently played sound channel signal, and the first speaker and the second speaker are further determined according to a playing sound channel of the speaker whose sound channel needs to be switched. In this implementation, the speaker with the to-be-switched sound channel can be determined more accurately and quickly.

With reference to FIG. 2*a* to FIG. 4*b*, the following uses examples to describe a specific implementation of this embodiment of this application.

FIG. 2*a* and FIG. 2*b* are two states of the electronic device 20 with a foldable screen. As shown in the figure, the electronic device 20 with a foldable screen includes a top speaker 21, a top speaker 23, a bottom speaker 22, and a bottom speaker 24.

When the electronic device 20 with a foldable screen plays music or a video in a folding state, the top speaker 21 and the top speaker 23 (or the bottom speaker 22 and the bottom speaker 24) play audio on a left sound channel, and the bottom speaker 22 and the bottom speaker 24 (or the top speaker 21 and the top speaker 23) play audio on a right sound channel.

When the electronic device 20 with a foldable screen plays music or a video in a stretched state, the top speaker 21 and the bottom speaker 22 (or the top speaker 23 and the bottom speaker 24) play audio on a left sound channel, and the top speaker 23 and the bottom speaker 24 (or the top speaker 21 and the bottom speaker 22) play audio on a right sound channel.

When the electronic device 20 with a foldable screen changes between the two states: from being folded to being stretched or being stretched to being folded, playing sound channels of the top speaker 21 and the bottom speaker 24 (or the bottom speaker 22 and the top speaker 23) remain unchanged, and the bottom speaker 22 and the top speaker 23 (or the top speaker 21 and the bottom speaker 24) perform sound channel fusion switching as the folding state changes. When the state coefficient σ is transited from 0 to 1 (or from 1 to 0), sound channel switching is completed and ended. That is, when the change of the electronic device 20 with a foldable screen between the two states: from being folded to being stretched (or being stretched to being folded), all switching between the left and right sound channels is implemented.

As shown in FIG. 3*a* to FIG. 3*d*, the sound channel fusion switching method in this embodiment of this application may also be applied to screen flipping of the electronic device with a foldable screen in a fully stretched state.

In FIG. 3*a*, the electronic device 20 with a foldable screen in a stretched state plays music or a video. The top speaker 21 and the bottom speaker 22 are located on the left side of the electronic device 20 with a foldable screen, and play audio on a left sound channel; and the top speaker 23 and the bottom speaker 24 are located on the right side of the electronic device 20 with a foldable screen, and play audio on a right sound channel in this state.

In FIG. 3*b*, the electronic device 20 with a foldable screen is rotated clockwise by 90 degrees, and plays music or a video. The bottom speaker 22 and the bottom speaker 24 are located on the left side of the electronic device 20 with a foldable screen, and play audio on a left sound channel; and the top speaker 21 and the top speaker 23 are located on the right side of the electronic device 20 with a foldable screen, and play audio on a right sound channel in this state.

Figure 3C:
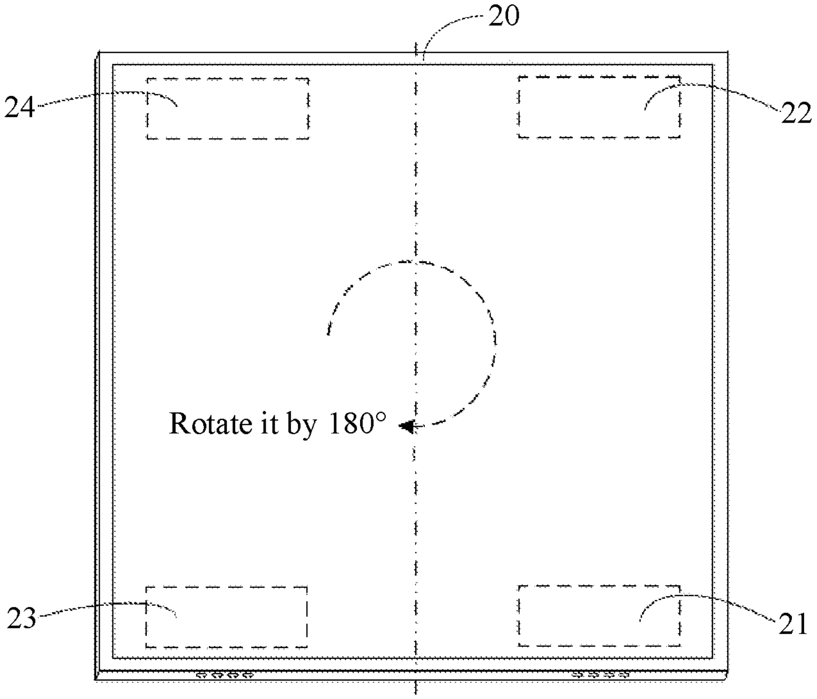
FIG. 3*c* is a schematic diagram in which an electronic device is rotated clockwise by 180 degrees in a stretched state according to an embodiment of this application.

In FIG. 3*c*, the electronic device 20 with a foldable screen is rotated clockwise by 180 degrees, and plays music/a video. The top speaker 23 and the bottom speaker 24 are located on the left side of the electronic device 20 with a foldable screen, and play audio on a left sound channel; and the top speaker 21 and the bottom speaker 22 are located on the right side of the electronic device 20 with a foldable screen, and play audio on a right sound channel in this state.

Figure 3D:
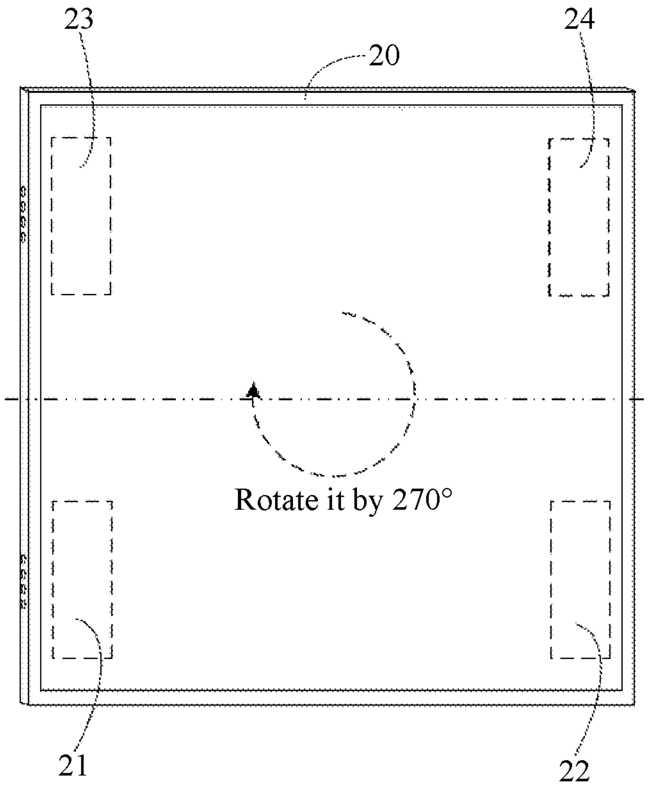
FIG. 3*d* is a schematic diagram in which an electronic device is rotated clockwise by 270 degrees in a stretched state according to an embodiment of this application.

In FIG. 3*d*, the electronic device 20 with a foldable screen is rotated clockwise by 270 degrees, and plays music/a video. The top speaker 21 and the top speaker 23 are located on the left side of the electronic device 20 with a foldable screen, and play audio on a left sound channel; and the bottom speaker 22 and the bottom speaker 24 are located on the right side of the electronic device 20 with a foldable screen, and play audio on a right sound channel in this state.

A sound channel fusion switching principle is the same as that in the foregoing manner. Frequency domain approximation may be performed following a device state coefficient σ, and left and right sound channel signals are separately processed to perform sound channel fusion switching, where σ is a ratio of an angle of screen flip. As shown in FIG. 3*a*, β is a flip angle and $\sigma=\beta/90°$. Each time the screen is flipped by 90 degrees, the speaker completes sound channel fusion switching once according to a flip state.

Starting from FIG. 3*a*, in an original screen state, $\beta=0°$, and the screen is rotated clockwise in sequence, that is, in a rotation process in which β changes from 0° to 90° to 180° to 270° to 360°, sound channels of the top speaker 21, the bottom speaker 22, the top speaker 23, and the bottom speaker 24 are switched as follows:

The top speaker 21 sequentially performs sound channel fusion switching from the left sound channel, the right sound channel, and the right sound channel to the left sound channel.

The bottom speaker 22 sequentially performs sound channel fusion switching from the left sound channel, the left sound channel, and the right sound channel to the right sound channel.

The top speaker 23 sequentially performs sound channel fusion switching from the right sound channel, the right sound channel, and the left sound channel to the left sound channel.

The bottom speaker 24 sequentially performs sound channel fusion switching from the right sound channel, the left sound channel, and the left sound channel to the right sound channel.

In this way, when the electronic device 20 with a foldable screen is stretched to play music or a video, sound channel fusion switching may be smoothly performed regardless of how a placement state is switched, and no phenomenon of interruption or stuttering occurs in a sound switching process.

For example, in a process in which the electronic device 20 with a foldable screen rotates from FIG. 3*a* to FIG. 3*d* in a stretched state, playing sound channels of the top speaker 21, the bottom speaker 22, the top speaker 23, and the bottom speaker 24 in an initial state (when a rotation angle is 0) are respectively a left sound channel, a left sound channel, a right sound channel, and a right sound channel. At a specified angle, sound channel signals of the top speaker 21 and the bottom speaker 24 are respectively at $X'_1(k)-$delta and $X'_2(k)+$delta. When rotation reaches 90 degrees, playing sound channels of the top speaker 21, the bottom speaker 22, the top speaker 23, and the bottom speaker 24 respectively fused and switched to a right sound channel, a left sound channel, a right sound channel, and a left sound channel. When the rotation reaches 180 degrees, a playback channel of the top speaker 21, the bottom speaker 22, the top speaker 23, and the bottom speaker 24 respectively fuses and switches to a right sound channel, a right sound channel, a left sound channel, and a left sound channel. When the rotation reaches 270 degrees, the playback channels of the top speaker 21, the bottom speaker 22, the top speaker 23, and the bottom speaker 24 are respectively fused and switched to the left sound channel, the right sound channel, the left sound channel, and the right sound channel. Each time when the device is rotated by 90 degrees, if a speaker is still on the same side (the left side or the right side), the playing sound channel of the speaker does not change.

According to the sound channel fusion switching technology in this embodiment of this application, in the foregoing four placement states, It can be achieved that two speakers on the left side play audio on a left sound channel, and two speakers on the right side play audio on a right sound channel. Regardless of the placement state, a phase of sound can be synchronized with a video picture. In addition, in a sound channel switching process, smooth fusion switching can be implemented, so that the user can obtain user auditory experience with a strong sense of science and technology.

As shown in FIG. 4*a* and FIG. 4*b*, the sound channel fusion switching method in this embodiment of this application may be further applied to sound channel switching in a screen flip scenario when a mobile phone plays a video in a landscape state in a case that the electronic device with a foldable screen or the common electronic device is in a fully folding state.

In FIG. 4*a*, the electronic device 20 with a foldable screen (or the common electronic device) is a folding state, and the electronic device 20 plays a video in a landscape state. The top speaker 21 and the top speaker 23 are located on the left side of the electronic device 20 with a foldable screen, and play audio on a left sound channel; and the bottom speaker 22 and the bottom speaker 24 are located on the right side of the electronic device 20 with a foldable screen, and play audio on a right sound channel in this state.

In FIG. 4*b*, after the electronic device 20 with a foldable screen is rotated clockwise or counterclockwise by 180 degrees, the electronic device 20 with a foldable screen plays a video in a landscape state. In this case, the bottom speaker 22 and the bottom speaker 24 are located on the left side of the electronic device 20 with a foldable screen, and play audio on a left sound channel; and the top speaker 21 and the top speaker 23 are located on the right side of the electronic device 20 with a foldable screen, and play audio on a right sound channel in this state.

A sound channel fusion switching principle is the same as that in the foregoing manner. Frequency domain approximation is performed as a device state coefficient $\sigma$, and left and right sound channel signals are separately processed to perform sound channel fusion switching, where $\sigma$ is a ratio of an angle of screen flip. As shown in FIG. 4*b*, $\gamma$ is a flip angle and $\sigma=\gamma/180°$. When the screen is flipped clockwise or counterclockwise by 180 degrees, the speaker completes sound channel fusion switching once according to a flip state.

In this way, the electronic device switches between the two placement states in a landscape state, so that a phase of sound can be synchronized with a video picture. The left speaker plays audio on a left sound channel and the right speaker plays audio on a right sound channel. In addition, in a sound channel switching process, no interruption or stuttering occurs, and smooth fusion switching is implemented, so that the user can obtain user auditory experience with a strong technological sense.

The sound channel fusion switching method in this embodiment of this application may also be applied to an electronic device with a rollable screen with four speakers, and sound channel fusion switching of a speaker may be implemented according to a scaling state of a rollable screen. For example, in a roll-up state, that is, a contracted state, two speakers on the top play audio on a left sound channel, and two speakers on the bottom play audio on a right sound channel. In a stretched state, the left two speakers are switched to play audio on the left sound channel, and the right two speakers are switched to play audio on the right sound channel, to implement a large-screen stereo sound effect. In a process of stretching or rolling up, the sound channel fusion switching method described in this embodiment of this application may be used to implement a smooth switching effect without stuttering and improve user auditory experience.

In the sound channel switching method in this embodiment of this application, a state change parameter of an electronic device is obtained in a case that the electronic device plays audio and a target state of the electronic device changes, where the state change parameter includes a folding angle, a rotation angle, or a scaling amplitude, and the scaling amplitude is a scaling amplitude of a screen of the electronic device; a first sound channel signal and a second sound channel signal are fused according to the state change parameter in a first fusion manner to obtain a third sound channel signal, and the first sound channel signal and the second sound channel signal are fused in a second fusion manner to obtain a fourth sound channel signal; and a first speaker is controlled to switch from playing the first sound channel signal to playing the third sound channel signal, and a second speaker is controlled to switch from playing the second sound channel signal to playing the fourth sound channel signal, where before a sound channel signal is switched, sound channels played by the first speaker and the second speaker do not match orientations in which the first speaker and the second speaker are located. In this way, when the target state of the electronic device changes, sound channel signals of speakers whose orientations change are fused according to the state change parameter, to ensure that a sound channel signal played by each speaker matches an orientation in which the speaker is located, thereby implementing smooth sound channel switching, and ensuring that the electronic device can obtain a better stereo play effect in a process of changing the target state.

It should be noted that, the sound channel switching method provided in the embodiments of this application may be performed by a sound channel switching apparatus, or a control module that is in the sound channel switching apparatus and that is configured to perform the sound channel switching method. In the embodiments of this application, that the sound channel switching apparatus performs the sound channel switching method is used as an example to describe the sound channel switching apparatus provided in the embodiments of this application.

Figure 5:
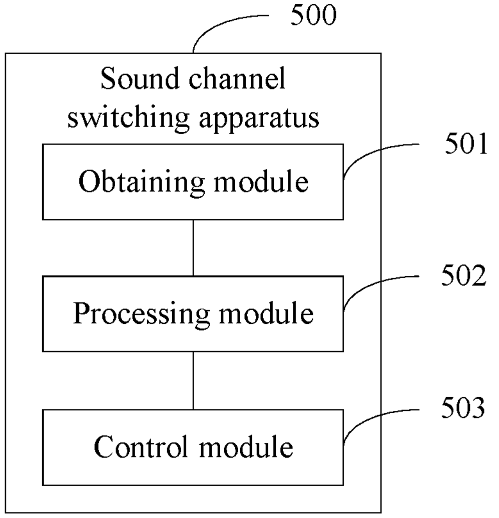
FIG. 5 is a schematic structural diagram of a sound channel switching apparatus according to an embodiment of this application.

FIG. 5 is a schematic structural diagram of a sound channel switching apparatus according to an embodiment of this application, applied to an electronic device. As shown in FIG. 5, the sound channel switching apparatus 500 includes:

an obtaining module 501, configured to obtain a state change parameter of the electronic device in a case that the electronic device plays audio and a target state of the electronic device changes, where the state change parameter includes a folding angle, a rotation angle, or a scaling amplitude, and the scaling amplitude is a scaling amplitude of a screen of the electronic device;

a processing module 502, configured to: fuse a first sound channel signal and a second sound channel signal according to the state change parameter in a first fusion manner to obtain a third sound channel signal, and fuse the first sound channel signal and the second sound channel signal in a second fusion manner to obtain a fourth sound channel signal; and a control module 503, configured to: control a first speaker to switch from playing the first sound channel signal to playing the third sound channel signal, and control a second speaker to switch from playing the second sound channel signal to playing the fourth sound channel signal, where before a sound channel signal is switched, sound channels played by the first speaker and the second speaker do not match orientations in which the first speaker and the second speaker are located.

Optionally, the processing module 502 includes:

an obtaining unit, configured to separately obtain a first spectrum amplitude value of the first sound channel signal and a second spectrum amplitude value of the second sound channel signal;

a determining unit, configured to determine a fusion component according to the state change parameter, the first spectrum amplitude value, and the second spectrum amplitude value;

a first processing unit, configured to perform first operation processing on the first spectrum amplitude value and the fusion component to obtain a third spectrum amplitude value of the fused third sound channel signal; and a second processing unit, configured to perform second operation processing on the second spectrum amplitude value and the fusion component to obtain a fourth spectrum amplitude value of the fused fourth sound channel signal.

Optionally, the determining unit includes:

a determining subunit, configured to determine a state coefficient according to the state change parameter and a maximum change value of the target state; and a calculating subunit, configured to calculate a product of the state coefficient and a first difference to obtain the fusion component, where the first difference is a difference between the first spectrum amplitude value and the second spectrum amplitude value.

Optionally, the first processing unit is configured to subtract the fusion component from the first spectrum amplitude value to obtain the third spectrum amplitude value; and the second processing unit is configured to add the second spectrum amplitude value and the fusion component to obtain the fourth spectrum amplitude value.

Optionally, when the state change parameter is a folding angle, the maximum change value of the target state is 180 degrees;

when the state change parameter is a rotation angle, the maximum change value of the target state is 90 degrees or 180 degrees; or when the state change parameter is a scaling amplitude, the maximum change value of the target state is a maximum scaling amplitude of the screen of the electronic device.

Optionally, the obtaining unit includes:

an obtaining subunit, configured to separately obtain a first amplitude characteristic of the first sound channel signal in frequency domain and a second amplitude characteristic of the second sound channel signal in frequency domain; and a processing subunit, configured to separately convert the first amplitude characteristic and the second amplitude characteristic into spectrum amplitude values, to obtain the first spectrum amplitude value and the second spectrum amplitude value.

Optionally, the sound channel switching apparatus 500 further includes:

a prediction module, configured to predict an orientation of each speaker in a plurality of speakers of the electronic device after the target state of the electronic device changes; and a determining module, configured to: in a case that a sound channel currently played by a target speaker in the plurality of speakers does not match a predicted orientation of the target speaker, determine that the target speaker is a to-be-switched speaker, where a speaker that currently plays the first sound channel signal in the to-be-switched speaker is the first speaker, and a speaker that currently plays the second sound channel signal in the to-be-switched speaker is the second speaker.

According to the sound channel switching apparatus in this embodiment of this application, a state change parameter of an electronic device is obtained in a case that the electronic device plays audio and a target state of the electronic device changes, where the state change parameter includes a folding angle, a rotation angle, or a scaling amplitude, and the scaling amplitude is a scaling amplitude of a screen of the electronic device; a first sound channel signal and a second sound channel signal are fused according to the state change parameter in a first fusion manner to obtain a third sound channel signal, and the first sound channel signal and the second sound channel signal are fused in a second fusion manner to obtain a fourth sound channel signal; and a first speaker is controlled to switch from playing the first sound channel signal to playing the third sound channel signal, and a second speaker is controlled to switch from playing the second sound channel signal to playing the fourth sound channel signal, where before a sound channel signal is switched, sound channels played by the first speaker and the second speaker do not match orientations in which the first speaker and the second speaker are located. In this way, when the target state of the electronic device changes, sound channel signals of speakers whose orientations change are fused according to the state change parameter, to ensure that a sound channel signal played by each speaker matches an orientation in which the speaker is located, thereby implementing smooth sound channel switching, and ensuring that the electronic device can obtain a better stereo play effect in a process of changing the target state.

The sound channel switching apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a laptop computer, a palmtop computer, an in-vehicle electronic terminal, a wearable device, an ultra-mobile personal computer (UMPC), a netbook, or a personal digital assistant (PDA). The non-mobile electronic device may be a server, a network attached storage (NAS), a personal computer (PC), a television (TV), an automated teller machine, or a self-service machine. This is not specifically limited in this embodiment of this application.

The sound channel switching apparatus in this embodiment of this application may be an apparatus with an operating system. The operating system may be an Android operating system, an iOS operating system, or another possible operating system. This is not specifically limited in this embodiment of this application.

The sound channel switching apparatus provided in this embodiment of this application can implement the processes implemented in the method embodiments in FIG. 1 to FIG. 4*b*. To avoid repetition, details are not described herein again.

Figure 6:
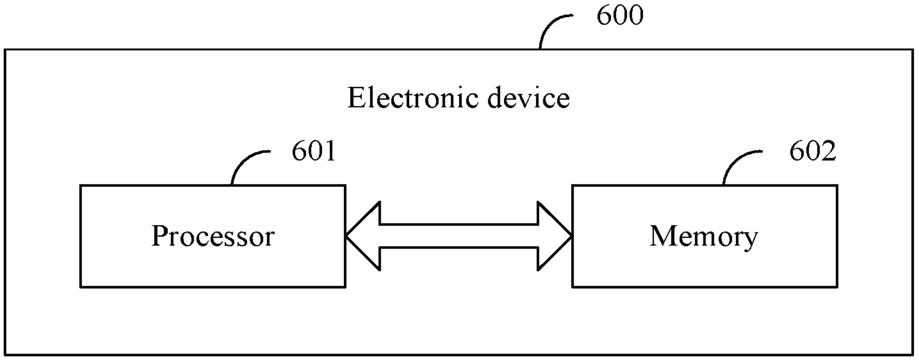
FIG. 6 is a schematic structural diagram of an electronic device according to an embodiment of this application.

Optionally, as shown in FIG. 6, an embodiment of this application further provides an electronic device 600, including a processor 601, a memory 602, and a program or an instruction that is stored in the memory 602 and that can be run on the processor 601. When the program or the instruction is executed by the processor 601, the processes of the foregoing sound channel switching method embodiment are implemented and a same technical effect can be achieved. To avoid repetition, details are not described herein again.

It should be noted that the electronic device in this embodiment of this application includes the foregoing mobile electronic device and the foregoing non-mobile electronic device.

Figure 7:
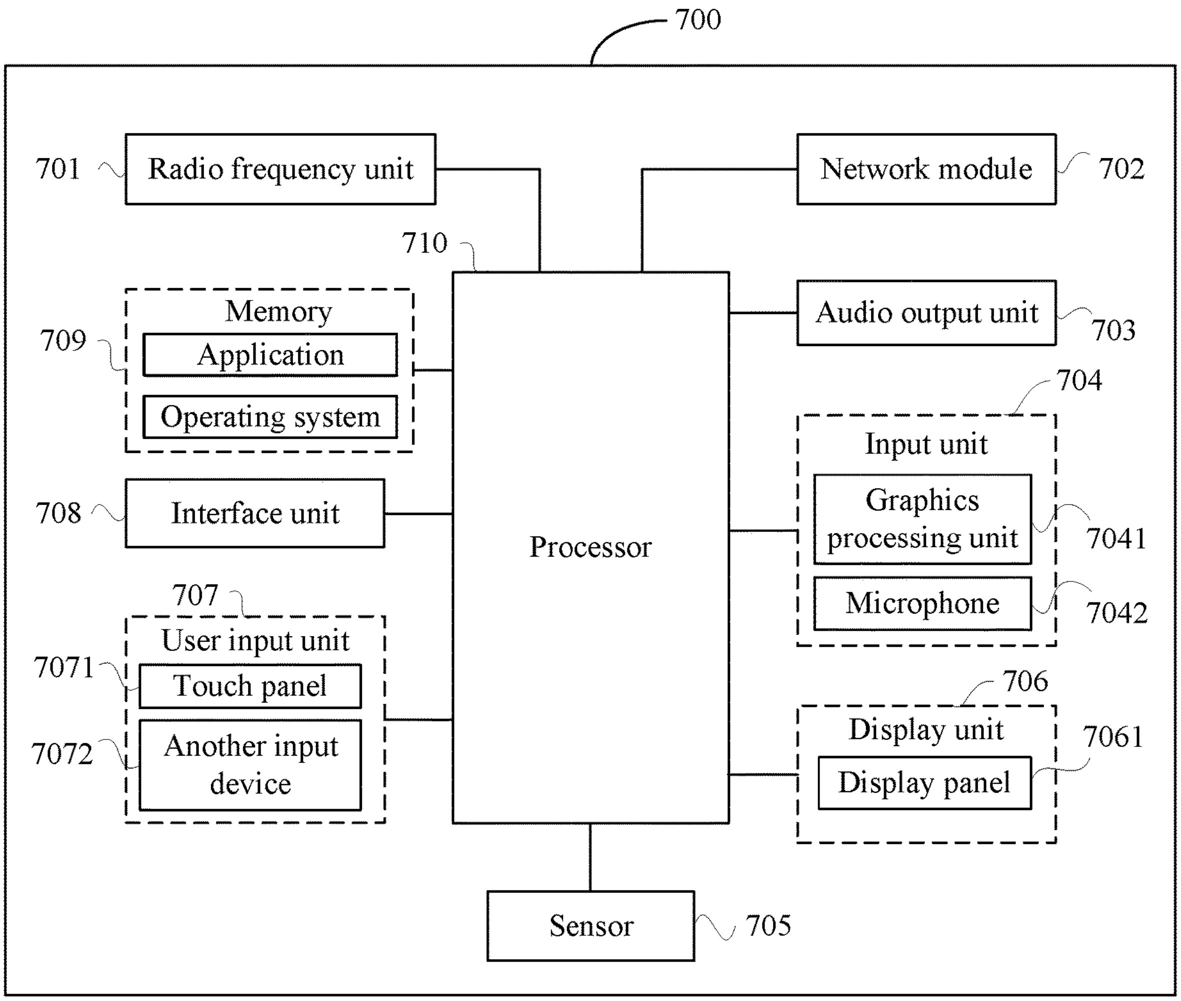
FIG. 7 is a schematic diagram of a hardware structure of an electronic device according to an embodiment of this application.

FIG. 7 is a schematic diagram of a hardware structure of an electronic device according to an embodiment of this application.

An electronic device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the electronic device 700 may further include a power supply (such as a battery) that supplies power to each component. The power supply may be logically connected to the processor 710 by using a power supply management system, to implement functions such as charging and discharging management, and power consumption management by using the power supply management system. The structure of the electronic device shown in FIG. 7 does not constitute a limitation on the electronic device. The electronic device may include components more or fewer than those shown in the diagram, a combination of some components, or different component arrangements. Details are not described herein.

The processor 710 is configured to obtain a state change parameter of the electronic device in a case that the electronic device plays audio and a target state of the electronic device changes, where the state change parameter includes a folding angle, a rotation angle, or a scaling amplitude, and the scaling amplitude is a scaling amplitude of a screen of the electronic device;

fuse a first sound channel signal and a second sound channel signal according to the state change parameter in a first fusion manner to obtain a third sound channel signal, and fuse the first sound channel signal and the second sound channel signal in a second fusion manner to obtain a fourth sound channel signal; and control a first speaker to switch from playing the first sound channel signal to playing the third sound channel signal, and control a second speaker to switch from playing the second sound channel signal to playing the fourth sound channel signal, where before a sound channel signal is switched, sound channels played by the first speaker and the second speaker do not match orientations in which the first speaker and the second speaker are located.

Optionally, the processor 710 is further configured to separately obtain a first spectrum amplitude value of the first sound channel signal and a second spectrum amplitude value of the second sound channel signal;

determine a fusion component according to the state change parameter, the first spectrum amplitude value, and the second spectrum amplitude value;

perform first operation processing on the first spectrum amplitude value and the fusion component to obtain a third spectrum amplitude value of the fused third sound channel signal; and perform second operation processing on the second spectrum amplitude value and the fusion component to obtain a fourth spectrum amplitude value of the fused fourth sound channel signal.

Optionally, the processor 710 is further configured to determine a state coefficient according to the state change parameter and a maximum change value of the target state; and calculate a product of the state coefficient and a first difference to obtain the fusion component, where the first difference is a difference between the first spectrum amplitude value and the second spectrum amplitude value.

Optionally, the processor 710 is further configured to subtract the fusion component from the first spectrum amplitude value to obtain the third spectrum amplitude value; and add the second spectrum amplitude value and the fusion component to obtain the fourth spectrum amplitude value.

Optionally, when the state change parameter is a folding angle, the maximum change value of the target state is 180 degrees;

when the state change parameter is a rotation angle, the maximum change value of the target state is 90 degrees or 180 degrees; or when the state change parameter is a scaling amplitude, the maximum change value of the target state is a maximum scaling amplitude of the screen of the electronic device.

Optionally, the processor 710 is further configured to separately obtain a first amplitude characteristic of the first sound channel signal in frequency domain and a second amplitude characteristic of the second sound channel signal in frequency domain; and separately convert the first amplitude characteristic and the second amplitude characteristic into spectrum amplitude values, to obtain the first spectrum amplitude value and the second spectrum amplitude value.

Optionally, the processor 710 is further configured to predict an orientation of each speaker in a plurality of speakers of the electronic device after the target state of the electronic device changes; and in a case that a sound channel currently played by a target speaker in the plurality of speakers does not match a predicted orientation of the target speaker, determine that the target speaker is a to-be-switched speaker, where a speaker that currently plays the first sound channel signal in the to-be-switched speaker is the first speaker, and a speaker that currently plays the second sound channel signal in the to-be-switched speaker is the second speaker.

According to the electronic device in this embodiment of this application, a state change parameter of the electronic device is obtained in a case that the electronic device plays audio and a target state of the electronic device changes, where the state change parameter includes a folding angle, a rotation angle, or a scaling amplitude, and the scaling amplitude is a scaling amplitude of a screen of the electronic device; a first sound channel signal and a second sound channel signal are fused according to the state change parameter in a first fusion manner to obtain a third sound channel signal, and the first sound channel signal and the second sound channel signal are fused in a second fusion manner to obtain a fourth sound channel signal; and a first speaker is controlled to switch from playing the first sound channel signal to playing the third sound channel signal, and a second speaker is controlled to switch from playing the second sound channel signal to playing the fourth sound channel signal, where before a sound channel signal is switched, sound channels played by the first speaker and the second speaker do not match orientations in which the first speaker and the second speaker are located. In this way, when the target state of the electronic device changes, sound channel signals of speakers whose orientations change are fused according to the state change parameter, to ensure that a sound channel signal played by each speaker matches an orientation in which the speaker is located, thereby implementing smooth sound channel switching, and ensuring that the electronic device can obtain a better stereo play effect in a process of changing the target state.

It should be understood that, in this embodiment of this application, the audio output unit 703 may be a speaker. The input unit 704 may include a graphics processing unit (GPU) 7041 and a microphone 7042, and the graphics processing unit 7041 processes image data of a still picture or video obtained by an image capture apparatus (such as a camera) in a video capture mode or an image capture mode. The display unit 706 may include a display panel 7061. Optionally, the display panel 7061 may be configured in a form such as a liquid crystal display or an organic light-emitting diode. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein. The memory 709 may be configured to store a software program and various data, including but not limited to an application and an operating system. An application processor and a modem processor may be integrated into the processor 710, the application processor mainly processes an operating system, a user interface, an application, and the like, and the modem processor mainly processes wireless communication. It can be understood that, alternatively, the modem processor may not be integrated into the processor 710.

An embodiment of this application further provides a readable storage medium. The readable storage medium stores a program or an instruction, and the program or the instruction is executed by a processor to implement the processes of the foregoing sound channel switching method embodiment and a same technical effect can be achieved. To avoid repetition, details are not described herein again.

The processor is a processor in the electronic device in the foregoing embodiment. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface, the communications interface is coupled to the processor, and the processor is configured to run a program or an instruction to implement the processes of the foregoing sound channel switching method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer software product. The computer software product is stored in a non-transient storage medium, and the computer software product is executed by at least one processor to implement the processes of the foregoing sound channel switching method embodiment, and a same technical effect can be achieved. To avoid repetition, details are not described herein again.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "including a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A sound channel switching method, applied to an electronic device, wherein the method comprises:

obtaining a state change parameter of the electronic device in a case that the electronic device plays audio and a target state of the electronic device changes, wherein the state change parameter comprises a folding angle, a rotation angle, or a scaling amplitude, and the scaling amplitude is a scaling amplitude of a screen of the electronic device;

fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal; and controlling a first speaker to switch from playing the first sound channel signal to playing the third sound channel signal, and controlling a second speaker to switch from playing the second sound channel signal to playing the fourth sound channel signal, wherein before a sound channel signal is switched, sound channels played by the first speaker and the second speaker do not match orientations in which the first speaker and the second speaker are located;

wherein the fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal comprises:

separately obtaining a first spectrum amplitude value of the first sound channel signal and a second spectrum amplitude value of the second sound channel signal;

determining a fusion component according to the state change parameter, the first spectrum amplitude value, and the second spectrum amplitude value;

performing first operation processing on the first spectrum amplitude value and the fusion component to obtain a third spectrum amplitude value of the fused third sound channel signal; and performing second operation processing on the second spectrum amplitude value and the fusion component to obtain a fourth spectrum amplitude value of the fused fourth sound channel signal.

2. The method according to claim 1, wherein the determining a fusion component according to the state change parameter, the first spectrum amplitude value, and the second spectrum amplitude value comprises:

determining a state coefficient according to the state change parameter and a maximum change value of the target state; and calculating a product of the state coefficient and a first difference to obtain the fusion component, wherein the first difference is a difference between the first spectrum amplitude value and the second spectrum amplitude value.

3. The method according to claim 2, wherein the performing first operation processing on the first spectrum amplitude value and the fusion component to obtain a third spectrum amplitude value of the fused third sound channel signal comprises:

subtracting the fusion component from the first spectrum amplitude value to obtain the third spectrum amplitude value; and the performing second operation processing on the second spectrum amplitude value and the fusion component to obtain a fourth spectrum amplitude value of the fused fourth sound channel signal comprises:

adding the second spectrum amplitude value and the fusion component to obtain the fourth spectrum amplitude value.

4. The method according to claim 2, wherein when the state change parameter is a folding angle, the maximum change value of the target state is 180 degrees;

when the state change parameter is a rotation angle, the maximum change value of the target state is 90 degrees or 180 degrees; or when the state change parameter is a scaling amplitude, the maximum change value of the target state is a maximum scaling amplitude of the screen of the electronic device.

5. The method according to claim 1, wherein the separately obtaining a first spectrum amplitude value of the first sound channel signal and a second spectrum amplitude value of the second sound channel signal comprises:

separately obtaining a first amplitude characteristic of the first sound channel signal in a frequency domain and a second amplitude characteristic of the second sound channel signal in the frequency domain; and separately converting the first amplitude characteristic and the second amplitude characteristic into spectrum amplitude values, so as to obtain the first spectrum amplitude value and the second spectrum amplitude value.

6. The method according to claim 1, wherein before the controlling a first speaker to switch from playing the first sound channel signal to playing the third sound channel signal, and controlling a second speaker to switch from playing the second sound channel signal to playing the fourth sound channel signal, the method further comprises:

predicting an orientation of each speaker in a plurality of speakers of the electronic device after the target state of the electronic device changes; and in a case that a sound channel currently played by a target speaker in the plurality of speakers does not match a predicted orientation of the target speaker, determining that the target speaker is a to-be-switched speaker, wherein a speaker that currently plays the first sound channel signal in the speaker to be switched is the first speaker, and a speaker that currently plays the second sound channel signal in the speaker to be switched is the second speaker.

7. An electronic device, comprising a processor, a memory, and a program or an instruction that is stored in the memory and that is executable by the processor, wherein the program or the instruction is executed by the processor to implement the following steps:

obtaining a state change parameter of the electronic device in a case that the electronic device plays audio and a target state of the electronic device changes, wherein the state change parameter comprises a folding angle, a rotation angle, or a scaling amplitude, and the scaling amplitude is a scaling amplitude of a screen of the electronic device;

fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal; and controlling a first speaker to switch from playing the first sound channel signal to playing the third sound channel signal, and controlling a second speaker to switch from playing the second sound channel signal to playing the fourth sound channel signal, wherein before a sound channel signal is switched, sound channels played by the first speaker and the second speaker do not match orientations in which the first speaker and the second speaker are located;

wherein the fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal comprises:

separately obtaining a first spectrum amplitude value of the first sound channel signal and a second spectrum amplitude value of the second sound channel signal;

determining a fusion component according to the state change parameter, the first spectrum amplitude value, and the second spectrum amplitude value;

performing first operation processing on the first spectrum amplitude value and the fusion component to obtain a third spectrum amplitude value of the fused third sound channel signal; and performing second operation processing on the second spectrum amplitude value and the fusion component to obtain a fourth spectrum amplitude value of the fused fourth sound channel signal.

8. The electronic device according to claim 7, wherein the determining a fusion component according to the state change parameter, the first spectrum amplitude value, and the second spectrum amplitude value comprises:

determining a state coefficient according to the state change parameter and a maximum change value of the target state; and calculating a product of the state coefficient and a first difference to obtain the fusion component, wherein the first difference is a difference between the first spectrum amplitude value and the second spectrum amplitude value.

9. The electronic device according to claim 8, wherein the performing first operation processing on the first spectrum amplitude value and the fusion component to obtain a third spectrum amplitude value of the fused third sound channel signal comprises:

subtracting the fusion component from the first spectrum amplitude value to obtain the third spectrum amplitude value; and the performing second operation processing on the second spectrum amplitude value and the fusion component to obtain a fourth spectrum amplitude value of the fused fourth sound channel signal comprises:

adding the second spectrum amplitude value and the fusion component to obtain the fourth spectrum amplitude value.

10. The electronic device according to claim 8, wherein when the state change parameter is a folding angle, the maximum change value of the target state is 180 degrees;

when the state change parameter is a rotation angle, the maximum change value of the target state is 90 degrees or 180 degrees; or when the state change parameter is a scaling amplitude, the maximum change value of the target state is a maximum scaling amplitude of the screen of the electronic device.

11. The electronic device according to claim 7, wherein the separately obtaining a first spectrum amplitude value of the first sound channel signal and a second spectrum amplitude value of the second sound channel signal comprises:

separately obtaining a first amplitude characteristic of the first sound channel signal in a frequency domain and a second amplitude characteristic of the second sound channel signal in the frequency domain; and separately converting the first amplitude characteristic and the second amplitude characteristic into spectrum amplitude values, so as to obtain the first spectrum amplitude value and the second spectrum amplitude value.

12. The electronic device according to claim 7, wherein before the controlling a first speaker to switch from playing the first sound channel signal to playing the third sound channel signal, and controlling a second speaker to switch from playing the second sound channel signal to playing the fourth sound channel signal, the program or the instruction is executed by the processor to implement the following steps:

predicting an orientation of each speaker in a plurality of speakers of the electronic device after the target state of the electronic device changes; and in a case that a sound channel currently played by a target speaker in the plurality of speakers does not match a predicted orientation of the target speaker, determining that the target speaker is a to-be-switched speaker, wherein a speaker that currently plays the first sound channel signal in the speaker to be switched is the first speaker, and a speaker that currently plays the second sound channel signal in the speaker to be switched is the second speaker.

13. A non-transitory readable storage medium, wherein a program or an instruction is stored on the non-transitory readable storage medium, and the program or the instruction is executed by a processor of an electronic device to implement the following steps:

obtaining a state change parameter of the electronic device in a case that the electronic device plays audio and a target state of the electronic device changes, wherein the state change parameter comprises a folding angle, a rotation angle, or a scaling amplitude, and the scaling amplitude is a scaling amplitude of a screen of the electronic device;

fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal; and controlling a first speaker to switch from playing the first sound channel signal to playing the third sound channel signal, and controlling a second speaker to switch from playing the second sound channel signal to playing the fourth sound channel signal, wherein before a sound channel signal is switched, sound channels played by the first speaker and the second speaker do not match orientations in which the first speaker and the second speaker are located;

wherein the fusing a first sound channel signal and a second sound channel signal according to the state change parameter in a first fusion manner to obtain a third sound channel signal, and fusing the first sound channel signal and the second sound channel signal in a second fusion manner to obtain a fourth sound channel signal comprises:

separately obtaining a first spectrum amplitude value of the first sound channel signal and a second spectrum amplitude value of the second sound channel signal;

determining a fusion component according to the state change parameter, the first spectrum amplitude value, and the second spectrum amplitude value;

performing first operation processing on the first spectrum amplitude value and the fusion component to obtain a third spectrum amplitude value of the fused third sound channel signal; and performing second operation processing on the second spectrum amplitude value and the fusion component to obtain a fourth spectrum amplitude value of the fused fourth sound channel signal.

14. The non-transitory readable storage medium according to claim 13, wherein the determining a fusion component according to the state change parameter, the first spectrum amplitude value, and the second spectrum amplitude value comprises:

determining a state coefficient according to the state change parameter and a maximum change value of the target state; and calculating a product of the state coefficient and a first difference to obtain the fusion component, wherein the first difference is a difference between the first spectrum amplitude value and the second spectrum amplitude value.

15. The non-transitory readable storage medium according to claim 14, wherein the performing first operation processing on the first spectrum amplitude value and the fusion component to obtain a third spectrum amplitude value of the fused third sound channel signal comprises:

subtracting the fusion component from the first spectrum amplitude value to obtain the third spectrum amplitude value; and the performing second operation processing on the second spectrum amplitude value and the fusion component to obtain a fourth spectrum amplitude value of the fused fourth sound channel signal comprises:

adding the second spectrum amplitude value and the fusion component to obtain the fourth spectrum amplitude value.

16. The non-transitory readable storage medium according to claim 14, wherein when the state change parameter is a folding angle, the maximum change value of the target state is 180 degrees;

when the state change parameter is a rotation angle, the maximum change value of the target state is 90 degrees or 180 degrees; or when the state change parameter is a scaling amplitude, the maximum change value of the target state is a maximum scaling amplitude of the screen of the electronic device.

17. The non-transitory readable storage medium according to claim 13, wherein the separately obtaining a first spectrum amplitude value of the first sound channel signal and a second spectrum amplitude value of the second sound channel signal comprises:

separately obtaining a first amplitude characteristic of the first sound channel signal in a frequency domain and a second amplitude characteristic of the second sound channel signal in the frequency domain; and separately converting the first amplitude characteristic and the second amplitude characteristic into spectrum amplitude values, so as to obtain the first spectrum amplitude value and the second spectrum amplitude value.

* * * * *